US012319082B2

(12) United States Patent
Calmet et al.

(10) Patent No.: US 12,319,082 B2
(45) Date of Patent: Jun. 3, 2025

(54) SECURITY DOCUMENT AND METHODS OF MANUFACTURING THE SAME

(71) Applicants: HID Global CID SAS, Suresnes (FR); HID Global Ireland Teoranta, Galway (IE)

(72) Inventors: Arnaud Calmet, Fanjeaux (FR); Paul Shane Doran, Galway (IE); Salvatore Serrao, Grattavache (CH)

(73) Assignees: HID Global CID SAS, Suresnes (FR); HID Global Ireland Teoranta, Galway (IE)

( * ) Notice: Subject to any disclaimer, the term of this patent is extended or adjusted under 35 U.S.C. 154(b) by 0 days.

(21) Appl. No.: 18/419,741

(22) Filed: Jan. 23, 2024

(65) Prior Publication Data

US 2024/0253384 A1 Aug. 1, 2024

(30) Foreign Application Priority Data

Jan. 30, 2023 (EP) .................................... 23315016

(51) Int. Cl.
*B42D 25/328* (2014.01)
*B42D 25/23* (2014.01)
(Continued)

(52) U.S. Cl.
CPC ........... *B42D 25/328* (2014.10); *B42D 25/23* (2014.10); *B42D 25/387* (2014.10); *B42D 25/405* (2014.10)

(58) Field of Classification Search
CPC .... B42D 25/328; B42D 25/23; B42D 25/387; B42D 25/405
(Continued)

(56) References Cited

U.S. PATENT DOCUMENTS

2012/0031978 A1* 2/2012 Hansen .................. B42D 25/45 235/488
2013/0285361 A1* 10/2013 Staub ..................... B42D 25/00 283/85
(Continued)

FOREIGN PATENT DOCUMENTS

DE 102007061827 6/2009
WO 2005051675 6/2005
(Continued)

OTHER PUBLICATIONS

"European Application Serial No. 23315016.8, Partial European Search Report mailed Jun. 27, 2023", 13 pgs.
(Continued)

*Primary Examiner* — Justin V Lewis
(74) *Attorney, Agent, or Firm* — Schwegman Lundberg & Woessner, P.A.

(57) ABSTRACT

A security document includes a security feature with a hologram and a color image arranged on top of each other. Holographic features of the hologram are visible when the security document is viewed under white light, and a plurality of image features of the color image are visible when the document is viewed under UV light. The image features are perfectly aligned with the holographic features. This can be achieved, for example, by providing one or more registration marks when forming the holographic features, and using said registration marks to later print the color image. Another possibility is to use the structure of the hologram to selectively apply two or more UV-sensitive ink materials onto the hologram to automatically align the same with the holographic features.

18 Claims, 2 Drawing Sheets

(51) Int. Cl.
*B42D 25/387* (2014.01)
*B42D 25/405* (2014.01)

(58) Field of Classification Search
USPC ....... 283/67, 70, 72, 74, 86, 89, 94, 98, 901
See application file for complete search history.

(56) References Cited

U.S. PATENT DOCUMENTS

| | | | | |
|---|---|---|---|---|
| 2014/0319817 | A1 | 10/2014 | Nikkila | |
| 2015/0306887 | A1* | 10/2015 | Waumans | B41M 3/14 347/102 |
| 2016/0075164 | A1 | 3/2016 | Sarrazin | |

FOREIGN PATENT DOCUMENTS

| | | |
|---|---|---|
| WO | 2011028289 | 3/2011 |
| WO | 2016113517 | 7/2016 |

OTHER PUBLICATIONS

"European Application Serial No. 23315016.8, Extended European Search Report mailed Oct. 6, 2023", 15 pgs.
"European Application Serial No. 23315016.8, Response filed Dec. 11, 2024 to Extended European Search Report mailed Oct. 6, 2023", 19 pages.

* cited by examiner

SECURITY DOCUMENT AND METHODS OF MANUFACTURING THE SAME

CROSS-REFERENCE TO RELATED APPLICATION(S)

This application claims priority to European Appl. No. 23315016.8, titled "Security Document and Methods of Manufacturing the Same," filed Jan. 30, 2023, the content of which is hereby incorporated by reference herein in its entirety.

TECHNICAL FIELD

The present disclosure generally relates to security features for security documents, in particular, personalizable security documents such as identification documents, driver's licenses and the like.

BACKGROUND

Generally, in the market of physical identification documents, a variety of different security features is used. In some applications, one or more holograms are used for securing such documents. The presence of a hologram makes it possible to obtain a visual effect that depends on the angle of observation. This creates a first level of security, with the holographic features being easily identifiable, while at the same time providing aesthetic and attractive effects. For example, the presence of a hologram may result in a color change and/or an animation effect. US 2016/0075164 A1 discloses a security element comprising a volume hologram.

There are also other approaches for providing security features for such identification documents or other security documents. One example is the use of fluorescent inks to provide features which are only visible under UV light. US 2014/0319817 A1 discloses a security document comprising a first pattern and a second pattern, which overlap to define a security pattern. The two patterns differ in their fluorescent properties such that upon irradiation with a first wavelength, the light emitted by the first pattern is dominant, and upon irradiation with a second wavelength, the light emitted by the second pattern is dominant.

The present disclosure is directed, at least in part, to improving or overcoming one or more aspects of prior systems, without being limited to a particular type of security document.

SUMMARY OF THE DISCLOSURE

According to one aspect of the present disclosure, a security document comprises a substrate and a security feature formed in the substrate. The security feature includes a hologram including a plurality of holographic features that are visible when the substrate is viewed from a first side under white light, and a color image including a plurality of image features that are visible when the substrate is viewed from the first side under UV light. The color image is in register with the hologram such that the plurality of image features is aligned with the plurality of holographic features when the substrate is viewed from the first side under UV light.

In another aspect, the present disclosure relates to a method of manufacturing a security document. The method comprises the steps of providing a first substrate sheet including a plurality of first-layer-forming portions, forming a plurality of holograms in the first substrate sheet, each of the plurality of holograms being associated with one of the first-layer-forming portions, together with forming the plurality of holograms, forming at least one registration mark on the first substrate sheet, the at least one registration mark being disposed outside of the plurality of first-layer-forming portions and having a fixed positional relation to the plurality of holograms. The method further comprises the steps of printing a plurality of color images in registration with the plurality of holograms using the at least one registration mark as a reference such that each color image is associated with a corresponding hologram and a plurality of image features of each color image is aligned with a plurality of hologram features of the corresponding hologram, separating the plurality of first-layer-forming portions from the first substrate sheet to form a plurality of first layers of a substrate for the security document, and forming the security document using one of the plurality of first layers.

In yet another aspect, the present disclosure relates to a method of manufacturing a security document, comprising the steps of providing a first substrate sheet including a plurality of first-layer-forming portions, forming a plurality of holograms in the first substrate sheet, each of the plurality of holograms being associated with one of the first-layer-forming portions and including a plurality of first structures corresponding to a first wavelength and having a first depth, and a plurality of second structures corresponding to a second wavelength and having a second depth that is less than the first depth, applying a first UV-sensitive ink material onto the first structures to register the first UV-sensitive ink material to the first structures, applying a second UV-sensitive ink material onto the second structures and on top of the first UV-sensitive ink material to register the second UV-sensitive ink material to the second structures, separating the plurality of first-layer-forming portions from the first substrate sheet to form a plurality of first layers of a substrate for the security document, and forming the security document using one of the plurality of first layers.

Other features and aspects of the present disclosure will be apparent from the following description and the accompanying drawings.

DETAILED DESCRIPTION

Figure 1:
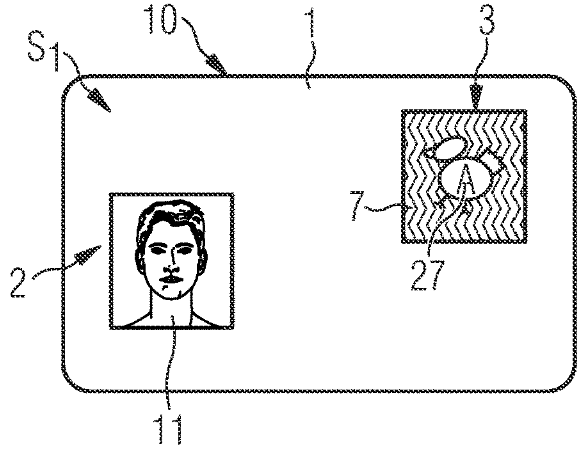
FIG. 1 shows a plan view of an exemplary security document in accordance with the present disclosure when viewed under white light.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that an additional layer of security for a security document can be obtained by combining a hologram with a further security feature such as a color image that is visible when viewed under UV light. In particular, it has been realized that such a combined security feature can be very difficult to replicate, because it is necessary to achieve a near perfect alignment of the hologram and the color image. Conventionally, the color image is printed in a process that is different from the process in which the hologram is provided. However, this makes it very difficult to achieve the desired alignment of the color image with the hologram.

According to the present disclosure, it has been realized that the desired alignment can be obtained by using an additional mark that is applied when the hologram is formed. Here, it has been realized that providing the mark on a substrate sheet including a plurality of substrates for security documents such that the mark is provided outside the respective substrates makes it possible to transfer the substrate sheet to a printing station after the holograms have been formed. At said printing station, a commonly used printing apparatus can use the mark as reference to print the color images on, for example, the layer including the hologram, to thereby achieve the desired alignment or “near perfect registration” between the holograms and the color images. Here, any known printing technology can be used to print the color images. The terms “registration” or “register”, as well as the terms “alignment” or “aligned” as used herein are not limited to an exact overlap of the image features with the holographic features (lines, shapes, etc. do not need to be at the same position when viewed from the first side of the substrate), but can also refer to any desired positional relationship between the image features and the holographic features (a certain distance, orientation, etc.). Preferably, the terms refer to a desired positional relationship within a certain tolerance, for example, less than 0.1 mm, more preferably, less than 0.05 mm, even more preferably, less than 0.01 mm.

It should be noted that, as described herein, the color images are only visible as color images when viewed under UV light. This can be achieved by providing two or more UV-sensitive inks that appear transparent when viewed under white light, but emit light of a specific wavelength when irradiated with UV light. The use of such UV-sensitive inks is well-known, such that a detailed description will be omitted herein. However, it will be appreciated that use of, for example, three appropriate UV-sensitive inks or ink materials can result in that color (for example, RGB) images can be obtained when the document is viewed under UV light.

The present disclosure is also based at least in part on the realization that the above-described registration of the color image to the hologram can be achieved using the inherent properties of a hologram that has been formed using different wavelengths. It is well-known that, generally, two or more different wavelengths can be used to form the holographic features, i.e., the structures that form the hologram. Here, it is evident that longer wavelengths result in structures having a greater depth than structures that are formed using smaller wavelengths. In other words, different depth regions of a hologram can be associated with different wavelengths of light that are used to generate the hologram. This allows for applying a plurality of UV-sensitive ink materials in sequence and in association with different depth regions of the hologram.

For example, a first amount of a first UV-sensitive ink material can be applied in a first step, which ink material will be distributed on the hologram and fill the deepest recesses of the same. In a second step, a second UV-sensitive ink material can be applied onto the first UV-sensitive ink material, and can essentially fill the structures that are provided at the second depth of the hologram.

In an advantageous manner, the ink material can be a material that is used during common demetallization processes of holograms, i.e., the UV-sensitive materials are included in respective demetallization protective inks and can again be printed using any known printing technique to achieve an automatic registration with the holographic features. If desired, a third UV-sensitive material can be applied on top of the second UV-sensitive material to allow for the possibility of achieving a three (or full) color image.

FIG. 1 shows a plan view of an exemplary security document 10 in accordance with the present disclosure. As shown in FIG. 1, security document 10 includes a substrate 1, for example, a polycarbonate or PVC substrate having a substantially rectangular shape. In particular, as shown in FIG. 1, security document 10 may be a personalized security document, i.e., include an image 11 (for example, a photograph or the like) of a person to which the document belongs. Image 11 may be formed in an image region 2 provided on a first side S1 of substrate 1 in a known manner. It will be appreciated, however, that the exemplary security document 10 shown in FIG. 1 is only one example for a security document in accordance with the present disclosure. The present disclosure can also be applied to other security documents, for example, banknotes, certificates, and the like.

In addition, as shown in FIG. 1, security document 10 includes a security feature 3 formed in substrate 1, for example, in the shape of a rectangular area in which one or more security features are provided. For example, as shown in FIG. 1, security feature 3 may include a hologram 7 including a plurality of holographic features 27 that are visible when substrate 1 is viewed from first side S1 under white light. Here, it should be appreciated that hologram 7 may be any type of known holographic feature that results in different perceivable images when, for example, an angle of observation is changed. As such holographic images are well-known to the skilled person, a detailed description will be omitted herein.

Figure 2:
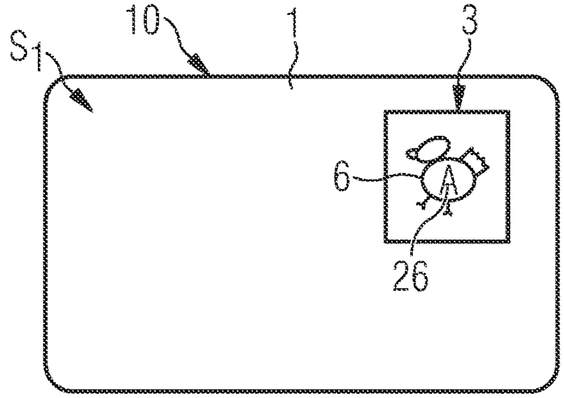
FIG. 2 shows a plan view of the exemplary security document in accordance with the present disclosure when viewed under UV light.

FIG. 2 shows another plan view of exemplary security document 10. As shown in FIG. 2, security feature 3 also includes a color image 6 including a plurality of image features 26 that are visible when substrate 1 is viewed from first side S1 under UV light. Here, any appropriate UV-sensitive materials may be used to form color image 6. For example, three different UV-sensitive inks can be used to form color image 6. Such UV-sensitive materials are well-known, such that a detailed description will be omitted. However, it will be appreciated that, generally, said UV-sensitive materials may be transparent under white light, i.e., cannot be perceived when security document 10 is viewed from first side S1 under white light. On the other hand, when security document 10 is viewed from first side S1 under UV light, the respective UV-sensitive materials exhibit fluorescence, resulting in light of different wavelengths being emitted by the UV-sensitive materials upon irradiation with UV light. In this manner, color image 6, for example, a full color image, can be observed under UV light.

In accordance with the present disclosure, color image 6 is provided in security document 10 such that it is in register with hologram 7. As used herein, the expression "in register with" should be understood such that color image 6 has a desired predetermined positional relation to hologram 7 (within a certain tolerance). In particular, in this desired positional relation, the plurality of image features 26 may be aligned with the plurality of holographic features of hologram 7 when substrate 1 is viewed from first side S1 under UV-light. Here, it will be appreciated that the plurality of image features and also the plurality of holographic features can be a subset of all image features of color image 6 and all holographic features of hologram 7, respectively. In other words, it is not necessary that all image features of color image 6 are aligned with all holographic features of hologram 7. Instead, it is sufficient when two or more image features of color image 6 are aligned with two or more holographic features of hologram 7.

For example, as shown in FIGS. 1 and 2, a background of hologram 7 may not be part of color image 6, and color image 6 may only include certain foreground features provided, for example, at the center of hologram 7. However, said foreground features are aligned (registered) with corresponding holographic features of hologram 7. As mentioned above, this alignment or registration can, but does not necessarily have to result in an overlap between the respective features. In some embodiments, a desired (fixed) shift or change in orientation of the features may be obtained.

In some embodiments, however, when security document 10 is viewed under UV light, for example, by turning on a UV light source, color image 6 (more particularly, the plurality of image features 26) appear at the same positions of the corresponding holographic features 27 that are visible when security document 10 is viewed under white light. Here, it may be advantageous that at least some of holographic features 27 are visible when substrate 1 is viewed from first side S1 under UV light. In other words, both the holographic features and the image features are visible under UV light, such that any deviation between the same is immediately recognizable. However, it will also be appreciated that the additional security can already be obtained even when the holographic features are not visible after switching on the UV light. Also in this case, a shift of the color image with respect to the corresponding features of hologram 7 can still be observed.

Figure 3:
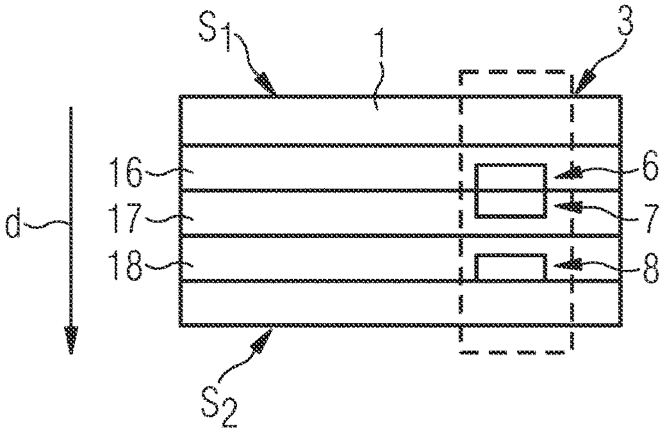
FIG. 3 shows a schematic cross-sectional view of the exemplary security document in accordance with the present disclosure.

FIG. 3 shows a schematic cross-sectional view of security document 10, in particular, security feature 3 of the same. As shown in FIG. 3, hologram 7 is formed in a first layer 17 of substrate 1, and color image 6 is formed in or on first layer 17. In other embodiments, however, color image 6 may be formed in or on a second layer 16 of substrate 1, for example, on top of first layer 17.

As shown in FIG. 3, security feature 3 extends inside substrate 1 from first side S1 to an opposite second side S2 along a depth direction d. Hologram 7 is formed in first layer 17 in an appropriate manner, which will be described in more detail below. Likewise, color image 6 is formed on first layer 17 (i.e., on hologram 7), which will also be described in more detail below. In particular, as will be described in the following, hologram 7 and color image 6 are formed in such a manner that the desired registration between the same can be obtained.

In some embodiments, second layer 16 is provided directly on top of first layer 17. In other embodiments, however, one or more additional layers of substrate 1 can be provided between first layer 17 and second layer 16, provided that said layers are at least partially transparent, such that hologram 7 can be observed from first side S1 when viewed under white light (i.e., in reflection).

In some embodiments, color image 6 is formed by a plurality of UV-sensitive inks that are printed on first layer 17 or second layer 16 in registration with hologram 7, in a manner that is described in the following. It will be appreciated that, for example, first layer 17 or second layer 16 generally will not be the top layer of substrate 1, and that instead one or more protection layers will be provided, for example, on top of first layer 17 or second layer 16. Of course, it will be appreciated that the one or more protection layers also should be at least partially transparent such that color image 6 and hologram 7 are visible when viewed in reflection from first side S1 of substrate 1. Further, in some embodiments, one or more additional layers, for example, a third layer 18 can be provided, for example, below first layer 17. Such a third layer 18 can include, for example, an additional security feature such as an exemplary watermark 8 that is shown in FIG. 3. However, it will be appreciated that such additional security features can also be omitted. In any case, it will be appreciated that security document 10 is formed by combining the plurality of different layers in an appropriate manner, for example, by commonly used lamination processes.

In other embodiments where hologram 7 and color image 6 are formed in the same layer, for example, layer 17 of substrate 1, hologram 7 may be a color hologram that includes a plurality of first structures **7*a* corresponding to a first wavelength and having a first depth d1 (measured with respect to an upper surface of hologram 7), and a plurality of second structures 7*b* corresponding to a second wavelength and having a second depth d2 that is less than the first depth d1. This is shown, for example, in the exemplary cross-sectional view of FIG. 4. For example, different wavelengths in the range from 30 nm to 800 nm can be used, resulting in corresponding depths d1 and 2 and associated widths of the respective structures. Further, color image 6 is formed by a first UV-sensitive ink material 6*a* (for example, a varnish or the like) provided in first structure 7*a* (for example, up to second depth d2), and a second UV-sensitive ink material 6*b* (for example, another varnish or the like) provided in second structure 7*b* and on top of first UV-sensitive ink material 6*a***.

Figure 4:
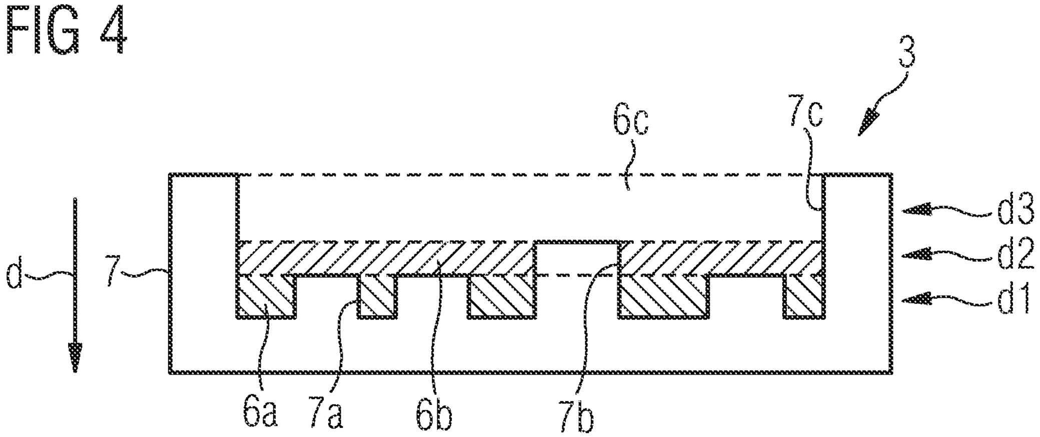
FIG. 4 shows a schematic cross-sectional view of an exemplary security feature in accordance with the present disclosure.

Here, it may be sufficient when two different UV-sensitive ink materials are used. However, in some embodiments, hologram 7 may further comprise a plurality of third structures **7*c* corresponding to a third wavelength and having a third depth d3 that is less than second depth d2. In such a case, color image 6 is further formed by a third UV-sensitive ink material 6*c* provided in third structure 7*c* and on top of second UV-sensitive ink material 6*b*, as illustrated in FIG. 4. Again, FIG. 4 illustrates that, when different wavelengths are used to form the holographic features, said wavelengths also determine the spatial resolution, in particular, the depth of the corresponding protrusions and recesses of the holographic features. Accordingly, as shown in FIG. 4, different wavelengths result in pits of different depths d1, d2 and d3. In a manner that will be described in more detail below, it is possible to provide the different UV-sensitive ink materials 6*a*, 6*b*, 6*c* at said different depths, thereby achieving an automatic registration of different colors of color image 6 with different image features of hologram 7**.

INDUSTRIAL APPLICABILITY

With the above-described configurations, it becomes possible to provide a color image in registration with a hologram, such that the color image appears, for example, at the exact same position as corresponding hologram features when a UV light source is switched on and the security document is viewed under UV light.

A first exemplary method of manufacturing security document 10 will be described in the following. As already mentioned above, in the first exemplary embodiment, a mark is used to perform a printing process that results in the desired registration of color image 6 with hologram 7. To this end, in a first step, a first substrate sheet 37 including a plurality of first-layer-forming portions 47 is provided. Here, first substrate sheet 37 may be formed of any appropriate material that can be used to later form security document 10, more importantly, to apply hologram 7 on the same. For example, first substrate sheet 37 may be a polycarbonate or PVC sheet. It will be appreciated that first-layer-forming portions 47, although indicated by solid lines in FIG. 5, generally will not be visible when forming holograms 7. Instead, first-layer-forming portions 47 correspond to designated portions of substrate sheet 37 on which the respective features are to be formed, and which later will form the layers of substrate 1.

In a next step, a plurality of holograms 7 is formed in first substrate sheet 37 in a known manner. Here, any appropriate process for forming hologram 7 can be used. For example, holograms 7 can be formed by embossing or by UV casting using an appropriate manufacturing device. After forming holograms 7, corresponding holographic structures are formed in each first-layer-forming portion 47. Here, to allow the subsequent registration of color images 6, together with forming the plurality of holograms 7, at least one registration mark 50 is formed on first substrate sheet 37. In particular, said at least one registration mark 50 is disposed outside of the plurality of first-layer-forming portions 47 and has a fixed positional relation to the plurality of holograms 7.

Figure 5:
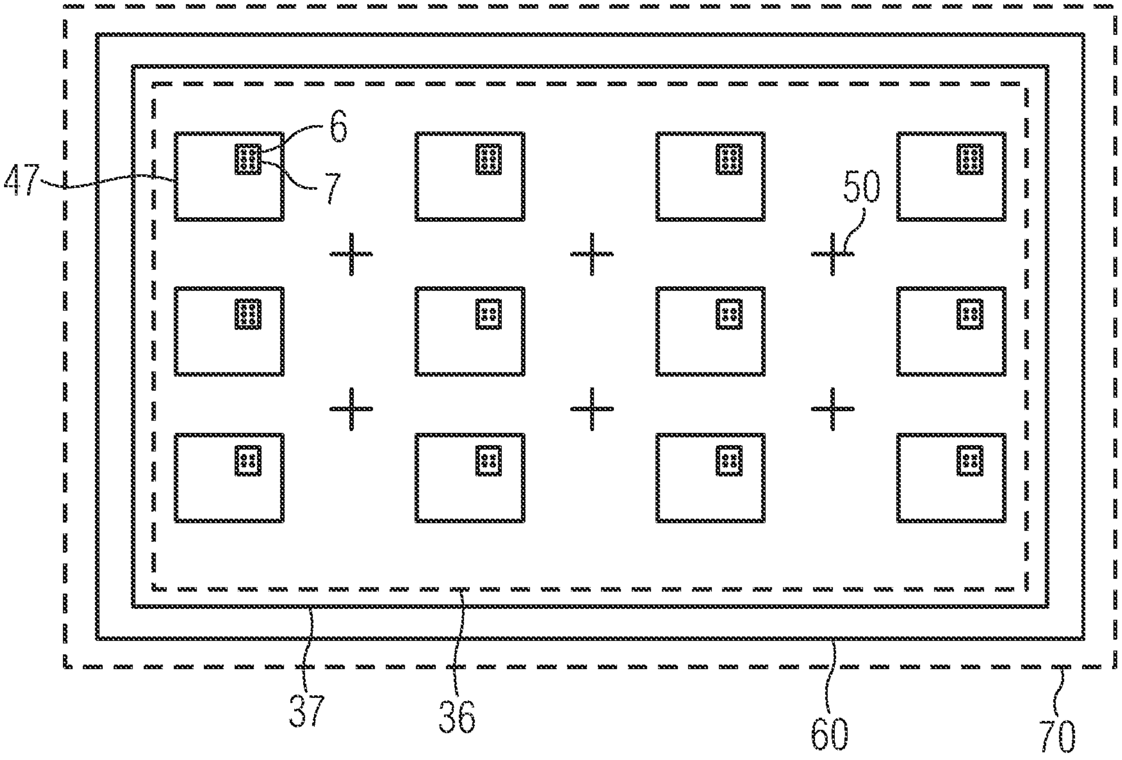
FIG. 5 shows a schematic plan view for illustrating an exemplary method of manufacturing a security document in accordance with the present disclosure.

In the example that is shown in FIG. 5, a plurality of cross-shaped registration marks 50 is provided essentially between four adjacent first-layer-forming portions 47. It will be appreciated that the shape, size and number of registration marks 50 can be selected in any desired manner, provided said at least one registration mark 50 is provided in portions of first substrate sheet 37 that are outside of first-layer-forming portions 47. As used herein, the expression "together with forming the plurality of holograms" should be understood such that the at least one registration mark 50 is formed at the same processing stage as the plurality of holograms 7, for example, using the same apparatus. As such, it is not absolutely necessary that the at least one registration mark 50 is formed simultaneously with the application of the holograms 7, but it can also be formed substantially at the same time or shortly before or after, preferably using the same apparatus, to automatically obtain the desired fixed positional relation between the plurality of holograms 7 and the at least one registration mark 50.

After formation of the plurality of holograms 7 and at least one registration mark 50, a plurality of color images 6 are printed in registration with the plurality of holograms 7, for example, on first substrate sheet 37, using the at least one registration mark 50 as a reference such that each color image 6 is associated with a corresponding hologram 7 and a plurality of image features 26 of each color image 6 is aligned with a plurality of hologram features 27 of the corresponding hologram 7 (see FIGS. 1 and 2).

Subsequently, the plurality of first-layer-forming portions 47 are separated from first substrate sheet 37 to form a plurality of first layers 17 of a substrate 1 for security document 10 (see FIG. 3). Finally, security document 10 is formed using one of the plurality of first layers 17. Here, it will be appreciated that, in some embodiments, the method may include the step of providing at least one at least partially transparent second substrate sheet 36 on top of the at least one first substrate sheet 37 after forming the plurality of holograms 7 and prior to printing the plurality of color images 6 (indicated by the dotted line in FIG. 5). Then, the plurality of color images 6 can be printed on second substrate sheet 36, again using the at least one registration mark 50 as a reference.

In some embodiments, the method further comprises the step of transferring first substrate sheet 37 from a first processing stage 60 to a second processing stage 70 after forming the plurality of holograms 7 and prior to printing the plurality of color images 6. This becomes possible due to the presence of the at least one registration mark 50, such that it is not necessary to use the same apparatus to form both the hologram 7 and the color image 6. Here, it should be appreciated that the expression "transferring from a first processing stage to a second processing stage" does not necessarily mean that first substrate sheet 37 is physically moved from a first stage to a second stage, but it can also mean that a first apparatus corresponding to the first processing stage is moved away from first substrate sheet 37, and a second apparatus corresponding to second processing stage 70 is arranged above first substrate sheet 37, as schematically indicated by the solid line and the dashed line surrounding first substrate sheet 37 in FIG. 5.

In some embodiments, the at least one mark 50 is visible when viewed under white light, for example, as a black (preferably solid color) mark. This allows for a reliable and easy identification of the at least one registration mark 50.

The plurality of color images 6 can be printed using any known printing technique, such as flexo printing, rotogravure printing, coating printing, offset printing, silkscreen printing, and the like. In some embodiments, digital printing techniques such as inkjet printing, laser printing, D2T2 printing, etc. can be used. As such techniques are well-known to the skilled person, a detailed description will be omitted herein.

In an alternative method of manufacturing security document 10, after providing first substrate sheet 37 including the plurality of first-layer-forming portions 47, a plurality of holograms 7 is again formed in first substrate sheet 37. In this exemplary embodiment, each of the plurality of holograms is associated with one of the first-layer-forming portions and includes a plurality of first structures **7*a* corresponding to a first wavelength and having a first depth d1, and a plurality of second structures 7*b* corresponding to a second wavelength and having a second depth d2 that is less than first depth d1. Here, it will be appreciated that the corresponding structures 7*a* and 7*b* can be obtained in any known manner from an original hologram that is applied onto first substrate sheet 37 using any known application process. As previously described, the different wavelengths resulting in first structure 7*a* and second structure 7*b* result in that there are portions of hologram 7 that have a greater depth than other portions of the same. When a first UV-sensitive ink material 6*a* is applied onto first structure 7*a* (for example, up to second depth d2), this results in an automatic registration of first UV-sensitive ink material 6*a* to first structure 7*a*. Here, it will be appreciated that the application of first UV-sensitive ink material 6*a* onto first structure 7*a* up to desired depth can be easily obtained by applying a predetermined amount of liquid first UV-sensitive ink material 6*a*, which may then flow into the recesses of first structure 7***a*, but will not exceed the desired depth, and then curing or otherwise solidifying said ink material.

In a next step, a second UV-sensitive ink material 6*b* is applied onto second structure 7*b* and on top of first UV-sensitive ink material 6*a* in the same manner to register second UV-sensitive ink material 6*b* to second structures 7*b*. Here, it will be appreciated that first and second UV-sensitive ink materials may be commonly used demetallization inks to which corresponding UV-sensitive pigments resulting in the desired colors have been added. Further, it will again be appreciated that the ink materials can be applied using any known flexo, rotogravure, coating, offset or silkscreen printing process.

After applying first and second UV-sensitive ink materials 6*a*, 6*b*, the plurality of first-layer-forming portions 47 can again be separated from first substrate sheet 37 to form a plurality of first layers 17 of substrate 1 for security document 10, and security document 10 can be formed using one of the plurality of first layers 17 as described above.

As shown, for example, in FIG. 4, in some embodiments, a further step of applying a third UV-sensitive ink material 6*c* on top of second UV-sensitive ink material 6*b* to register third UV-sensitive ink material 6*a* to third structures 7*c* of each of the plurality of holograms 7 can be provided. Here, third structures 7*c* again correspond to a third wavelength and have a third depth d3 that is less than the second depth d2.

Also using the above exemplary method, a desired registration between the plurality of image features 26 of color image 6 and the plurality of holographic features 27 of hologram 7 can be obtained for each substrate 1.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A security document comprising:

a substrate; and a security feature formed in the substrate, the security feature comprising:

a hologram including a plurality of holographic features that are visible when the substrate is viewed from a first side under white light and under UV light; and a color image including a plurality of image features that are visible when the substrate is viewed from the first side under UV light and are transparent when the substrate is viewed from the first side under white light;

wherein the color image is in register with the hologram such that the plurality of image features is aligned with the plurality of holographic features when the substrate is viewed from the first side under UV light.

2. The security document of claim 1, wherein the color image is in register with the hologram such that the plurality of image features overlaps the plurality of holographic features when the substrate is viewed from the first side under UV light.

3. The security document of claim 1, wherein the hologram and the color image are formed in a same layer of the substrate.

4. The security document of claim 1, wherein the hologram is formed in a first layer of the substrate, and the color image is formed in or on a second layer of the substrate.

5. The security document of claim 4, wherein the second layer is provided directly on top of the first layer.

6. The security document of claim 1, wherein the color image is formed by a plurality of UV-sensitive inks that are printed on one or more layers of the substrate.

7. The security document of claim 6, wherein the hologram further comprises a plurality of third structures corresponding to a third wavelength and having a third depth that is less than the second depth, and wherein the color image is further formed by a third UV-sensitive ink material provided in the third structures and on top of the second UV-sensitive ink material.

8. The security document of claim 1, wherein the hologram is a color hologram that includes a plurality of first structures corresponding to a first wavelength and having a first depth, and a plurality of second structures corresponding to a second wavelength and having a second depth that is less than the first depth, and wherein the color image is formed by a first UV-sensitive ink material provided in the first structures and up to the second depth, and a second UV-sensitive ink material provided in the second structures and on top of the first UV-sensitive ink material.

9. A method of manufacturing a security document, comprising:

providing a first substrate sheet including a plurality of first-layer-forming portions;

forming a plurality of holograms in the first substrate sheet, each of the plurality of holograms being associated with one of the first-layer-forming portions;

together with forming the plurality of holograms, forming at least one registration mark on the first substrate sheet, the at least one registration mark being disposed outside of the plurality of first-layer-forming portions and having a fixed positional relation to the plurality of holograms;

printing a plurality of color images in registration with the plurality of holograms using the at least one registration mark as a reference such that each color image is associated with a corresponding hologram and a plurality of image features of each color image is aligned with a plurality of hologram features of the corresponding hologram;

separating the plurality of first-layer-forming portions from the first substrate sheet to form a plurality of separate first layer portions; and forming the security document using one of the plurality of separate first layer portions.

10. The method of claim 9, wherein the plurality of image features of each color image overlaps the plurality of holographic features of the corresponding hologram when viewed under UV light.

11. The method of claim 9, further comprising the step of transferring the first substrate sheet from a first processing stage to a second processing stage after forming the plurality of holograms and prior to printing the plurality of color images.

12. The method of claim 9, wherein the at least one registration mark is visible when viewed under white light.

13. The method of claim 9, wherein the plurality of color images is printed using at least one of flexo printing, rotogravure printing, coating printing, offset printing, or silkscreen printing.

14. The method of claim 9, further comprising the step of providing at least one at least partially transparent second substrate sheet on top of the at least one first substrate sheet after forming the plurality of holograms and prior to printing the plurality of color images.

15. The method of claim 14, comprising printing the plurality of color images on the second substrate sheet.

16. A method of manufacturing a security document, comprising:

providing a first substrate sheet including a plurality of first-layer-forming portions;

forming a plurality of holograms in the first substrate sheet, each of the plurality of holograms being associated with one of the first-layer-forming portions and including a plurality of first structures corresponding to a first wavelength and having a first depth, and a plurality of second structures corresponding to a second wavelength and having a second depth that is less than the first depth;

applying a first UV-sensitive ink material onto the first structures to register the first UV-sensitive ink material to the first structures;

applying a second UV-sensitive ink material onto the second structures and on top of the first UV-sensitive ink material to register the second UV-sensitive ink material to the second structures;

separating the plurality of first-layer-forming portions from the first substrate sheet to form a plurality of separate first layer portions; and forming the security document using one of the plurality of separate first layer portions.

17. The method of claim 16, wherein the applying the first and second UV-sensitive ink materials thereby forms respective color images, a plurality of image features of each color image being aligned with a plurality of hologram features of a corresponding hologram and overlapping the same when viewed under UV light.

18. The method of claim 16, further comprising applying a third UV-sensitive ink material on top of the second UV-sensitive ink material to register the third UV-sensitive ink material to third structures of each of the plurality of holograms, the third structures corresponding to a third wavelength and having a third depth that is less than the second depth.

* * * * *